United States Patent

[11] 3,627,915

[72] Inventors Alphonsus Maria Henricus Schellekens; Antonius Hendrikus Hubertus Jozef Nillesen, both of Emmasingel, Eindhoven, Netherlands

[21] Appl. No. 826,241
[22] Filed May 20, 1969
[45] Patented Dec. 14, 1971
[73] Assignee U.S. Philips Corporation New York, N.Y.
[32] Priority May 22, 1968
[33] Netherlands
[31] 6807207

[54] COLOR DEMODULATOR WITH SHUNT COUPLED CURRENT TAKEOVER COLOR KILLER CIRCUIT
8 Claims, 2 Drawing Figs.

[52] U.S. Cl. .......... 178/5.4 SD, 178/5.4 CIL
[51] Int. Cl. .......... H04n 9/50, H04n 9/48
[50] Field of Search .......... 178/5.4 CK, 5.4 SD

[56] References Cited

UNITED STATES PATENTS

| | | | |
|---|---|---|---|
| 3,506,776 | 4/1970 | Rennik | 178/5.4 SD |
| 3,513,256 | 5/1970 | Bilotti | 178/5.4 SD |

*Primary Examiner*—Robert L. Griffin
*Assistant Examiner*—George G. Stellar
*Attorney*—Frank R. Trifari

ABSTRACT: A color demodulator is in a series circuit having a constant current source and a supply voltage source. A current takeover circuit is parallel coupled to the demodulator. A color killer circuit cuts off the demodulator when no color burst is being received and therefore, the takeover circuit conducts all of the current from the current source to the load impedance. The direct current flowing through the load impedance then remains the same when either a monochrome or a color signal is being processed.

INVENTORS
ALPHONSUS M.H. SCHELLEKENS
ANTONIUS H.H.J. NILLESEN
BY
Frank R. Trifari
AGENT INVENTORS
ALPHONSUS M.H. SCHELLEKENS
ANTONIUS H.H.J. NILLESEN
BY
[signature]
AGENT

COLOR DEMODULATOR WITH SHUNT COUPLED CURRENT TAKEOVER COLOR KILLER CIRCUIT

The invention relates to a color killing circuit particularly for a color television receiver comprising an active phase demodulator arranged in series with a DC-voltage supply source and a load impedance, the demodulator having an input which is connected to an output of a color killing voltage generator.

Such a color killing circuit is known from U.S. Pat. specification No. 2,752,417. Color killing on the demodulators is attractive because it is then impossible for a disturbing signal to appear from the demodulators in the color difference amplifiers in case of monochrome reception. In fact, this would have a disturbing influence particularly when using a passive integrator as a chrominance subcarrier regenerator. A drawback of the known color killing circuit is, however, that when processing a monochrome signal the DC-voltage across the load impedance is different than when processing a chrominance signal. This imposes limits upon a DC coupling having an additional circuit arrangement as is often desirable, for example, in color television receivers.

It is an object of the invention to obviate this drawback.

To this end a color killing circuit according to the invention of the kind described in the preamble is characterized in that a current source circuit is incorporated in the series arrangement of the DC-voltage supply source, the load impedance and the demodulator, and that a current takeover circuit, which can be operated by an output voltage of the color killing voltage generator, is connected parallel to the demodulator.

It is achieved by these steps that the direct current flowing through the load impedance remains the same both when processing a monochrome signal and when processing a chrominance signal so that DC-coupling to a following stage is now possible without difficulty.

A further elaboration of the color killing circuit is characterized in that the current source circuit is connected to the demodulator which connection is also the input for the color killing voltage of the demodulator. The output of the color killing voltage generator is connected through the current takeover circuit to the demodulator. The current takeover over circuit in construction with the current source circuit and an active element of the demodulator being connected as a differential amplifier for the color killing voltage. The demodulator in a preferred embodiment being a transistor circuit of the long-tailed pair type having a transistor in the common emitter line, the current takeover circuit and the current source circuit each including a transistor. The transistor in the common emitter line together with the transistor in the current take over circuit and the transistor in the current source circuit forms the differential amplifier for the color killing voltage. Such a color killing circuit can easily be formed together with the demodulators in one integrated circuit. This is advantageous because then a plurality of functions (demodulation, color killing, maintenance DC-component) are simultaneously incorporated in one and the same integrated unit. As a result interconnections to the remaining parts of the circuit arrangement are avoided as much as possible. A still further combination of functions in one integrated unit may be obtained if according to a further elaboration of the invention a luminance signal voltage source circuit is incorporated in the series arrangement of the DC-voltage supply source and the demodulator.

In order that the invention may be readily carried into effect, a few embodiments thereof will now be described in detail, by way of example with reference to the accompanying drawings in which the greater part of details which are not important for the understanding of the invention have been omitted for the sake of clarity.

Figure 1:
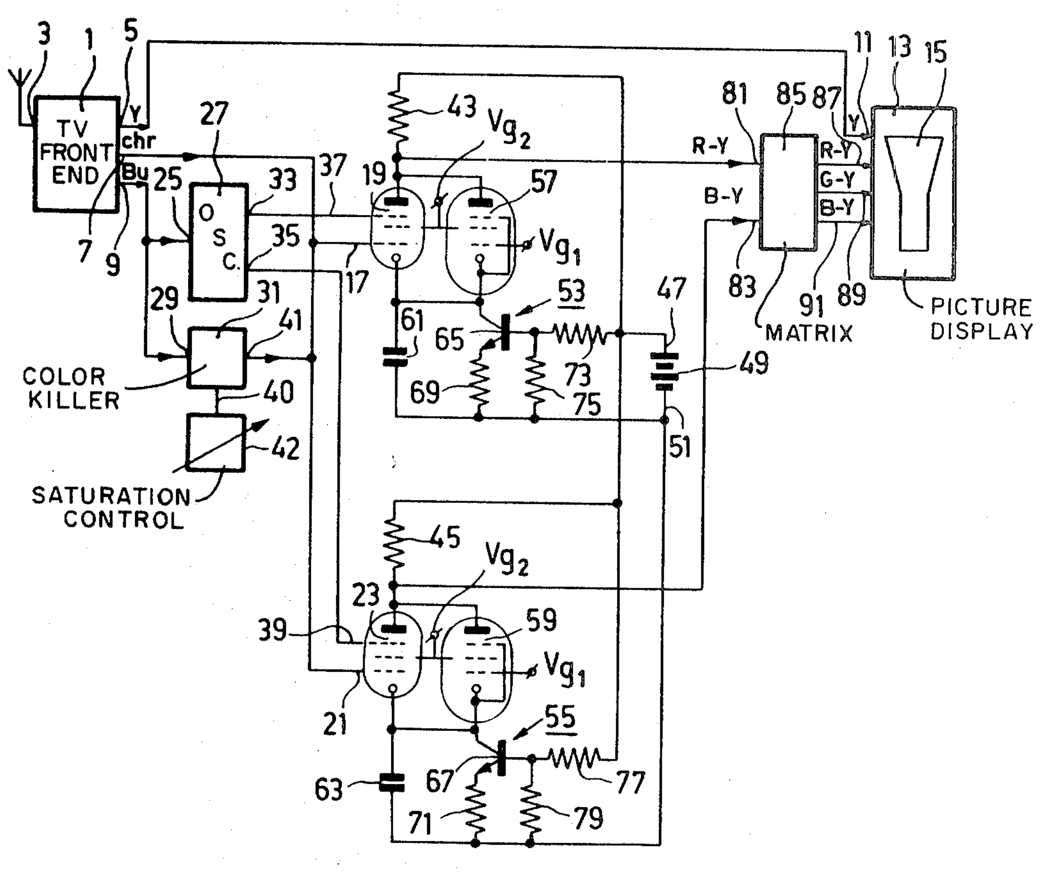
FIG. 1 shows by way of a concise circuit diagram a color television receiver including a color killing circuit according to the invention.

In FIG. 1 a section 1 has an input 3 and a plurality of outputs 5, 7 and 9. The section 1 includes, for example, the conventional means for amplifying and splitting up a composite television signal received at the input 3 into its comprising signals. When receiving a color television signal at the input 3 a luminance signal Y appears at the output 5, a chrominance signal Chr modulated on a subcarrier appears at the output 7 and a color burst signal Bu appears at the output 9.

The output 5 of the section 1 is connected to an input 11 of a picture display section 13. A luminance signal Y applied to the input 11 may be reproduced on a picture display tube 15 in the picture display section 13.

The output 7 of the section 1 is connected to an input 17 of a pentode 19 connected as a synchronous demodulator and to an input 21 of a pentode 23 connected as a synchronous demodulator. When receiving a color television signal at the input 3 of the section 1 a modulated chrominance subcarrier is applied to the inputs 17 and 21 of the synchronous demodulators 19 and 23.

The output 9 of the section 1 is connected to an input 25 of a chrominance subcarrier regenerator 27 and to an input 29 of a color killing voltage generator 31. When receiving a color television signal at the input of the section color a color burst signal Bu appears at the inputs 25 and 29.

The chrominance subcarrier regenerator 27 has two outputs 33 and 35. The output 33 is connected to an input 37 of the synchronous demodulator 19. The output 35 is connected to an input 39 of the synchronous demodulator 23. When receiving a color television signal synchronized reference signal appear at the outputs 33 and 35 of the chrominance subcarrier regenerator 27 with the aid of the color burst signal applied to the input 25 said synchronized reference signals having a phase such that the signals applied to the inputs 17 and 21 of the synchronous demodulators 19 and 23 can therein be demodulated in the correct phase.

The color killing voltage generator 31 has an output 41 which is connected to the inputs 17 and 21 of the synchronous demodulators 19 and 23 and is furthermore connected through a connection 40 to a saturation control device 42. When receiving a color television signal at the input 3 of the section 1 and hence in the presence of the color burst signal Bu at the input 29 of the color voltage generator 31, a voltage arises at the output 41 which activates the synchronous demodulators 19 and 23.

When receiving a monochrome signal at at the input 3 of the section 1 and hence in the absence of a color burst signal Bu at the input 29 of the color killing voltage generator 31., a voltage arises at the output 41 thereof which renders the demodulators 19 and 23 inactive.

The control grids of the pentodes 19 and 23 serving as synchronous demodulators are connected to the inputs 17 and 21, their suppressor grids are connected to the inputs 37 and 39 and their screen grids are connected to a supply voltage $V_{g_2}$.

The anodes of the pentodes 19 and 23 are connected through load impedances 43 and 45 to one end 47 of a DC-voltage supply source 49. According to the invention the other end 51 of the DC-voltage supply source 49 is connected through two current source circuits 53 and 55 to the cathodes of the pentodes 19 and 23, respectively.

According to the invention, pentodes 57 and 59 serving as a current take over circuit are furthermore connected parallel to the demodulators 19 and 23, respectively. The control grids of the pentodes 57 and 59 are connected to a supply voltage $V_{g_1}$ and their screen grids are connected to a supply voltage $V_{g_2}$. The cathodes of the pentodes 57 and 59 are connected to the cathodes of the demodulator pentodes 19 and 23, respectively, and are decoupled for AC-voltage by means of capacitors 61 and 63 whose other ends are connected to the connection 51 of the supply source 49. The anodes of the pentodes 57 and 59 are connected to the anodes of the pentodes 19 and 23, respectively.

The current source circuits 53 and 55 are formed by transistors 65 and 67, respectively, whose collectors are connected to the cathodes of the valves 19 and 57 and 23 and 59, respectively, whose emitters are connected through series resistors 69 and 71 to the connection 51 of the supply source 49 and whose bases are connected to tappings on potential dividers 73, 75 and 77, 79, respectively, arranged between the connections 47 and 51 of the supply source. The transistors 65 and 67 in these circuits each supply a direct current which is substantially independent of their collector voltage.

The pentodes 57 and 59 serving as current take over circuits receive through their cathodes a voltage originating from the output 41 of the color killing voltage generator 31 via the grid—cathode trajectory of the pentodes 19 and 23.

The anodes of the demodulators 19 and 23 are connected to inputs 81 and 83, respectively, of a matrix 85.

The matrix 85 has three outputs which are connected through connections 87, 89 and 91 to the display section 13.

When a red color difference signal (R–Y) obtained from the demodulator 19 is present at the input 81 and a blue color difference signal (B–Y) obtained from the demodulator 23 is present at the input 83, a red (R–Y), a green (G–Y) and a blue (B–Y) color difference signal are applied through the connections 87, 89 and 91 to the picture display section 13.

The operation of the current source and current transfer circuits according to the invention will now be described.

When a color television signal is present at the input 3 of the section 1, the color burst signal Bu appears at the input 29 of the color killing voltage generator 31. A positive DC-voltage which is adjustable by means of the saturation control device 42 then arises at the output 41 of the color killing voltage generator 31. If the adjustment of this device is such that the maximum positive voltage is present at the output 41, then this voltage also present at the control grids of the pentodes 19 and 23 and causes these pentodes to conduct. The current source circuits 53 and 55 supply a given current which for the concurring adjustments of the pentodes 19, 23, 57 and 59 is substantially independent of these adjustments. Due to the presence of the maximum positive voltage across the control grids of the valves 19 and 23, substantially all the current supplied by the current source circuits 53 and 55 will flow through these valves. In fact, the valves 57 and 59 are then cut off because the color killing voltage across the control grids of the then conducting valves 19 and 23 is passed on but for a small difference voltage to their cathodes and hence to the cathodes of the valves 57 and 59. The control grids of the valves 57 and 59 are connected to a voltage such that the positive cathode voltage now present causes the cathode to be positive relative to the control grids in such a manner that there cannot flow any current in the valves 57 and 59. The direct current supplied by the current sources 53 and 55 flows through the load impedances 43 and 45 and produces a DC-voltage thereacross which is determined by the DC resistance of these impedances and the amplitude of the direct current supplied by the current source. This direct current furthermore has the variations occurring due to the demodulator action of the valves 19 and 23 which variations now have a maximum value and are not important for the understanding of the operation of the circuit arrangement according to the invention, and will not be dealt with further in this connection.

When decreasing the positive voltage across the control grids of the valves 19 and 23 by adjustment of the saturation control device 42 to a smaller saturation, the direct current flowing through the valves 19 and 23 becomes smaller. At the same time the cathode voltage decreases as well as that of the valves 57 and 59 which then start to conduct. Dependent on the adjustment of the control device 42 a current distribution is adjusted between the valves 19 and 23 and 57 and 59, respectively, while yet the overall direct current flowing through the load impedances 43 and 45 remains the same and hence the DC-voltage component thereacross. The AC-voltage component will decrease as a result of a decrease of the current flowing through the demodulator valves 19 and 23 so that the saturation is decreased. To obtain a satisfactory linearity of the demodulator action of the pentodes 19 and 23 these must have a so-called control characteristic in this case.

When a color burst signal Bu is absent at the input 29 of the color killing voltage generator 31 the output voltage at the output 41 becomes so low that there can no longer flow any current through the valves 19 and 23. All direct current supplied by the current source circuits 53 and 55 then flows via the valves 57 and 59 through the load impedances 43 and 45, respectively, and causes a DC-voltage thereacross which is as high as that in the other cases described, while yet it is impossible to develop an AC-voltage through the valves 19 or 23 across this impedance because these valves are cut off.

Since the current source circuits 53 and 55 always supply the same direct current and the overall direct current flowing through the load impedances 43 and 45 is thus always the same, the same DC-voltage always arises across these load impedances. The circuit arrangement is thus particularly suitable for use of a DC coupling to a following stage.

In the foregoing a television signal was processed for which phase demodulation was necessary such as, for example, for a signal of the NTSC type. It will, however, be evident that a similar type of circuit arrangement as the one described above can be used for a system in which frequency demodulation is necessary such as for signals of the SECAM type, if first the frequency modulation is converted into phase modulation as is common practice in FM demodulators.

Figure 2:
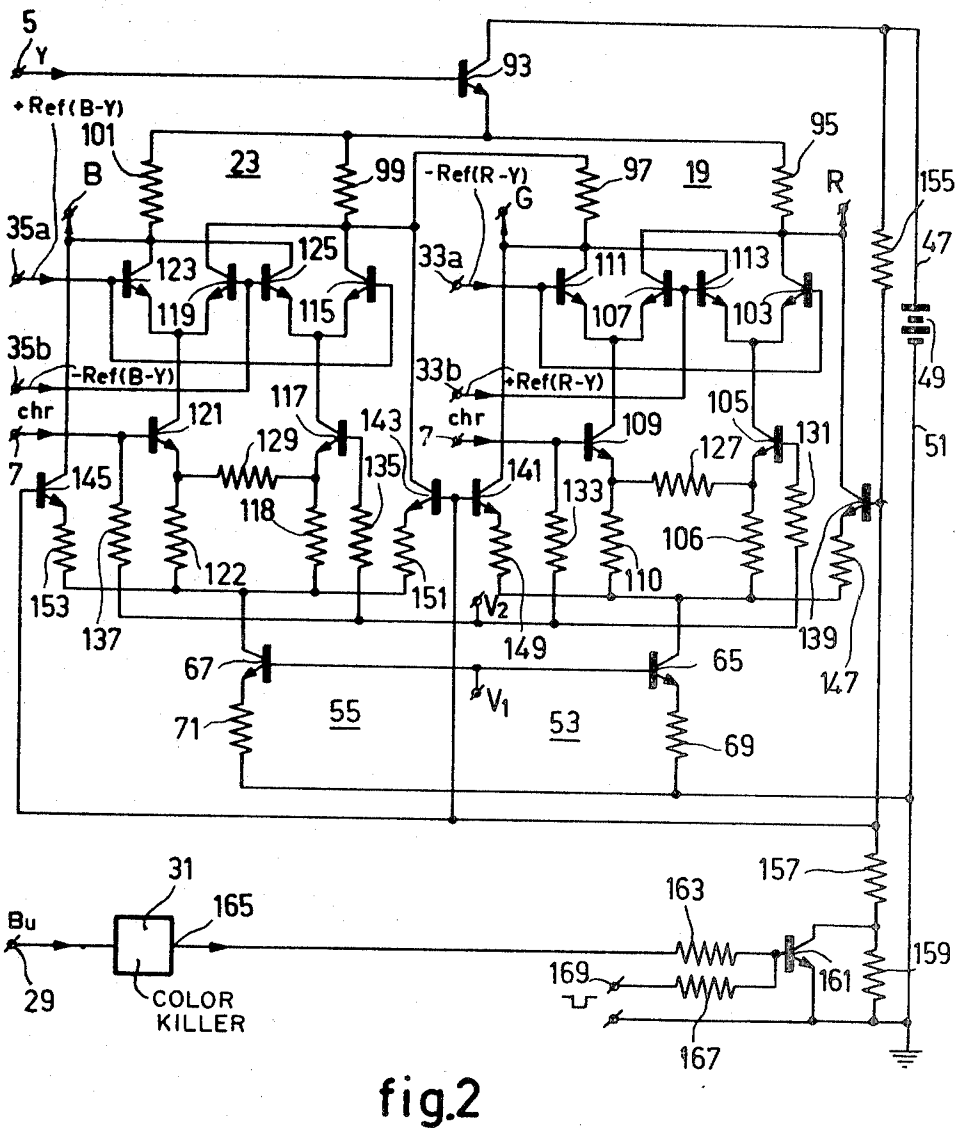
FIG. 2 shows a color killing circuit according to the invention having a combination of a large number of functions such as demodulation color killing, maintenance DC-component, matrixing and saturation control, formed with transistors and particularly suitable for use in an integrated switching unit.

In FIG. 2 the same reference numerals have been used for components corresponding to those of FIG. 1.

A large number of functions have been united in the circuit arrangement. Thus, the matrixing of the demodulated (R–Y) and (B–Y) signals is not effected separately as in the circuit 85 of FIG. 1, but at the demodulators 19 and 23 which to this end are each formed with two parts. Furthermore, the matrixing of the Y-signal with the difference signals is not effected in the picture display section 13 as in the embodiment of FIG. 1. According to an elaboration of the invention, an emitter follower 93 is incorporated in series with the DC supply 49 and the demodulators 19 and 23, the luminance signal Y being applied to the base of said emitter follower whose emitter feeds the demodulators 19 and 23.

The demodulators 19 and 23 are each composed of two partly coincident parts each having a load resistor. The load resistors of the parts of the demodulator 19 are indicated by the reference numerals 95 and 97, those of the parts of the demodulator 23 are indicated by the reference numerals 99 and 101. The load resistors 95, 99 and 101 are connected at one end to the emitter of the transistor 93 whose collector is connected to the terminal 47 of the DC-voltage supply source 49. The load resistor 97 of the demodulator 19 is connected in series with the load resistor 99 of the demodulator 23 and for this purpose is connected at one end to the end of the resistor 99 remote from the emitter of the transistor 93.

The ends of the load resistors 95, 97, 99 and 101 remote from the emitter of the transistor 93 are connected as follows. The said end of the resistor 95 is connected to a parallel arrangement of two series branches, one series branch of which is a series arrangement of two transistors 103 and 105 and a resistor 106 and the other series branch of which is a series arrangement of two transistors 107 and 109 and a resistor 110. The said end of the resistor 97 is connected to a parallel arrangement of two series branches, one series branch of which is a series arrangement of a transistor 111 and the transistor 109 and the resistor 110 and the other series branch of which is a series arrangement of a transistor 113 and the transistor 105 and the resistor 106. The said end of the resistor 99 is connected to a parallel arrangement of two series branches, one series branch of which is a series arrangement of two transistors 115 and 117 and a resistor 118 and the other series branch of which is a parallel arrangement of two transistors 119 and 121 and a resistor 122. The said end of the resistor 101 is connected to a parallel arrangement of two series branches, one series branch of which is a series arrangement of a transistor 123 and the transistor 121 and the resistor 122 and the other series branch of which is a series arrangement of a transistor 125, the transistor 117 and the resistor 118. The collectors of the transistor pairs 103, 107; 111, 113; 115, 119 and 123, 125 are connected to the resistors 95, 97, 99 and 101, respectively, and the emitters of the transistor pairs 103, 113; 107, 111; 115, 125 and 119, 123 are connected to the collectors of the transistors 105, 109, 117 and 121, respectively. The emitters of the transistors 105 and 109 are furthermore connected together through a resistor 127 and those of the transistors 117 and 121 are connected together through a resistor 129.

The bases of the transistors 103 and 111 are connected together and to an output 33*a* of the chrominance subcarrier regenerator 27 (see FIG. 1). Likewise the bases of the transistors 107 and 113 are connected to an output 33*b*, the bases of the transistors 115 and 123 are connected to an output 35*a* and the bases of the transistors 119 and 125 are connected to an output 35*b* of the chrominance subcarrier regenerator 27.

The bases of the transistors 105, 109, 117 and 121 are connected through resistors 131, 133, 135 and 137, respectively, to a supply voltage $V_2$. The bases of the transistors 109 and 121 are connected to the output 7 of the section 1 (FIG. 1).

According to the invention each demodulator 19 and 23 is connected through the current source circuits 53 and 55 to the supply source 49, and each part of the demodulators is shunted by a current take over circuit formed by a series arrangement of a transistor and a resistor. Thus, the collector of a transistor 139 is connected to the collectors of the transistors 103 and 107, the collector of a transistor 141 is connected to the collectors of the transistors 111 and 113, the collector of a transistor 143 is connected to the collectors of the transistors 115 and 119 and the collector of a transistor 145 is connected to the collectors of the transistors 123 and 125. The emitters of the transistors 139 and 141 are connected through resistors 147 and 149 to the collector of the transistor 65 of a current source circuit 53. The emitters of the transistors 143 and 145 are connected through resistors 151 and 153 to the collector of the transistor 67 of the current source circuit 55. The bases of the transistors 139, 141, 143 and 145 are interconnected and connected to a tapping on a potential divider connected across the DC-voltage supply source 49. This potential divider is formed by a resistor 155 connected to the connection 47 of the supply source 49 and a series arrangement of resistors 157 and 159. The resistor 159 is connected to the connection 51 of the supply source 49 and is shunted by a transistor 161. The collector of the transistor 161 is connected to the connection between the resistors 157 and 159, its emitter is connected to the connection between the resistor 159 and the supply source 49, and its base is connected through a resistor 163 to an output 165 of the color killing voltage generator 31. The base of the transistor 161 is furthermore connected through a resistor 167 to an input 169 to which a pulse of line frequency is applied.

The operation of the synchronous demodulators 19 and 23 is supposed to be sufficiently known and will not be described further. It will suffice to mention that when the demodulators operate and when a chrominance signal is applied to the terminals 7 and a reference signal of the correct phase is applied to the terminals 33*a* and *b* and 35*a* and *b*, a demodulated (R–Y) signal arises, for example, across the resistor 95, a demodulated (B–Y) signal arises across the resistor 101, a demodulated —(R–Y) signal arises across the resistor 97 and a demodulated —(B–Y) signal arises across the resistor 99. A demodulated (G–Y) signal then arises across the series arrangement of the resistors 97 and 99 in case of a correct value of these resistors relative to that of the resistors 95 and 101, while an R-signal for the control of the red gun of the picture display tube 15 is produced at the collectors of the transistors 103 and 107 by the addition of the Y-signal originating from the emitter of the transistor 93 at the voltages developed across the said resistors, a G-signal for the control of the green gun at the collectors of the transistors 111 and 113 and a B-signal for the control of the blue gun at the collectors of the transistors 125 and 123.

The luminance signal voltage supplied by the luminance signal voltage source transistors 93 then does not exert influence on the current flowing through the demodulators because this is determined by the current source circuits 53 and 55.

The operation of the circuit arrangement as regards the color killing is as follows.

When receiving a monochrome television signal the terminal 29 does not receive a color burst signal (Bu) and the output of the color killing voltage generator 31 provides a voltage such that the transistor 161 is cut off. The voltage at the bases of the transistors 139, 141, 143 and 145 then becomes so high that all current supplied by the current source circuits 53 and 55 starts to flow through these transistors and the transistors 105, 109, 117 and 121 are cut off. The latter fact is evident as follows. As a result of the high-base voltages of the transistors 139, 141 143 and 145 the collector voltage of the transistors 65 and 67 will likewise become high and hence the emitter voltages of the transistors 105, 109, 117 and 121. The bases of these transistors are connected to a supply voltage V2 which is so low that a flow of current through these transistors is then impossible.

The transistors 139 and 141 each convey half the current supplied by the current source 53 and the transistors 143 and 145 each convey half the current supplied by the current source 55. This is achieved by correct choice of the resistors 147 and 149 which must be mutually equal and by correct choice of the likewise mutually equal resistors 151 and 153. The resistors 147, 149, 151 and 153 have high-values relative to the base-emitter resistance of the transistors 139, 141, 143 and 145, respectively.

When receiving a color television signal, a color burst signal Bu appears at the terminal 29 and as a result thereof a voltage which is so high that the transistor 161 starts to conduct arises at the output 165 of the color killing voltage generator 31. As a result the voltage drop across the resistor 155 becomes larger and the voltage at the bases of the transistors 139, 141, 143, 145 becomes so low that these transistors are cut off. The current supplied by the current sources 53 and 55 now flows entirely through the demodulators 19 and 23. In fact, the collector voltage of the transistor 65 is then low as a result of the low-base voltage of the transistors 139, 141, 143 and 145 and the emitter follower action thereof. The emitters of the transistors 105, 109, 117 and 121 therefor assume a lower voltage than the voltage $V_2$ at their bases and consequently the said transistors conduct. Each of the transistors 105 and 109 now conveys an average half of the current supplied by the current source 53 which is achieved by the correct choice of the resistors 106, 110 and 127. The same applies to the transistors 117 and 121, the current source 55 and the resistors 118, 122 and 129.

The voltage pulse originating from the input 169 and supplied through the resistor 167 to the base of the transistor 161 always occurs during the line flyback. This voltage pulse blocks the transistor 161 at least during the occurrence of the color burst signal independently of the color killing voltage applied through the resistor 163. The demodulators 19 and 23 are rendered inoperative during the occurrence of the voltage pulse because the current takeover transistors 139, 141, 143 and 145 then conduct and convey the overall current supplied by the current sources 65 and 67. As a result a demodulated color burst signal is prevented from occurring at the outputs of the demodulators which may be necessary for the use of a possible clamping circuit in a circuit arrangement following the demodulators.

The same direct current flows through the load resistors 95, 97, 99 and 101 in case of any kind of television signal received and no undesired voltage step occurs when switching over from color to monochrome reception and conversely. Also in this embodiment having R, G and B control this advantage envisaged by the invention is thus obtained. A DC-coupling to the following stages of the receiver can be used without difficulty.

Although this embodiment does not employ saturation control on the demodulators it may be used in this case by having a saturation control device render the current flowing through the transistor 161 adjustable when receiving a color television signal so that the voltage at the bases of the transistors 139, 141, 143 and 145 is adjustable and hence the current distribution among these transistors and the demodulators. As regards the demodulated signal the output voltage of the demodulators is then adjustable while the DC-component always remains the same. The resistors 147 and 149 must then have such a high-value that there does not flow substantially any alternating current through the transistors 139, 141, 143 and 145.

In the embodiment described the emitters of the current transfer transistors 139, 141, 143 and 145 are connected through resistors 147, 149 and 151, 153 to the collectors of the corresponding current source transistors 65 and 67. However, it is alternatively possible to directly connect the emitters of the transistors 139, 141, 143 and 145 to the emitters of the transistors 105, 109, 107 and 121 respectively. A saturation control in the manner as described above, is then not possible. The required color killing voltage for switching from color to monochrome display is then, however, smaller than in the case shown in the drawing.

It will be evident that in the case of SECAM demodulators where the inputs of the phase demodulators are coupled by a phase shifting material the circuit of the invention can also be used.

What is claimed is:

1. A circuit operated from a direct current voltage source for demodulating a television signal having luminance, synchronization, chrominance, and burst signal components, said circuit comprising a demodulator coupled to receive both said chrominance signal and a color subcarrier signal regenerated from said burst signal; a color killer means coupled to said demodulator for disabling said demodulator in response to the absence of said burst signal; a current source coupled in series between said demodulator and said voltage source; and a current takeover means coupled in parallel with said demodulator for conducting direct current to the output of said demodulator upon the disabling of said demodulator, whereby the direct current output of said demodulator remains the same when either a monochrome or a color signal is being processed.

2. A circuit as claimed in claim 1 wherein said color killer means is coupled to said demodulator through said current takeover means; said current takeover means, said current source, and said demodulator being coupled in a differential amplifier configuration with respect to said color killer means.

3. A circuit as claimed in claim 2 wherein said demodulator comprises two emitter coupled transistors having a common emitter line and a transistor coupled in said common emitter line; and means for coupling the chrominance signal to the common emitter line transistor.

4. A circuit as claimed in claim 1 further comprising a luminance signal source coupled within said series circuit.

5. A circuit as claimed in claim 4 wherein said luminance signal source comprises a transistor having an emitter and a collector coupled to said demodulator and to said direct current voltage source respectively.

6. A circuit as claimed in claim 1 wherein said demodulator comprises two push-pull sections and two load impedances coupled between said voltage source and its respective section; said current takeover means being coupled in parallel with each of said sections.

7. A circuit as claimed in claim 1 further comprising a saturation control coupled to said color killer means.

8. A circuit as claimed in claim 1 further comprising means coupled to receive said synchronization signal for disabling said demodulator during the horizontal flyback time of said television signal.

* * * * *